United States Patent
Morrison

(10) Patent No.: US 9,015,050 B2
(45) Date of Patent: *Apr. 21, 2015

(54) SYSTEM AND METHOD FOR TARGETED ADVERTISING

(71) Applicant: AT&T Intellectual Property I, L.P., Atlanta, GA (US)

(72) Inventor: Patrick Jason Morrison, Mountain View, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/071,945

(22) Filed: Nov. 5, 2013

(65) Prior Publication Data

US 2014/0058846 A1    Feb. 27, 2014

Related U.S. Application Data

(63) Continuation of application No. 12/257,954, filed on Oct. 24, 2008, now Pat. No. 8,577,685.

(51) Int. Cl.
*G10L 25/00* (2013.01)
*G06Q 30/02* (2012.01)
*G10L 15/26* (2006.01)
*G10L 15/02* (2006.01)
*G10L 15/08* (2006.01)

(52) U.S. Cl.
CPC .......... *G06Q 30/0269* (2013.01); *G10L 15/265* (2013.01); *G10L 2015/088* (2013.01); *G10L 15/02* (2013.01); *G10L 15/26* (2013.01)

(58) Field of Classification Search
CPC ........ G10L 15/00; G10L 15/26; G10L 15/256
USPC .................................................. 704/270, 275
See application file for complete search history.

(56) References Cited

U.S. PATENT DOCUMENTS

| | | | |
|---|---|---|---|
| 6,332,120 B1* | 12/2001 | Warren | 704/235 |
| 6,792,406 B1* | 9/2004 | Fujimura et al. | 704/257 |
| 6,988,071 B1* | 1/2006 | Gazdzinski | 704/275 |
| 7,127,403 B1* | 10/2006 | Saylor et al. | 704/275 |
| 7,711,564 B2* | 5/2010 | Levy et al. | 704/270 |
| 7,878,307 B2* | 2/2011 | Newville et al. | 187/396 |
| 7,899,670 B1* | 3/2011 | Young et al. | 704/235 |
| 8,239,887 B2* | 8/2012 | Gilboa et al. | 725/18 |
| 8,577,685 B2* | 11/2013 | Morrison | 704/275 |
| 2002/0035474 A1* | 3/2002 | Alpdemir | 704/270 |
| 2003/0055652 A1* | 3/2003 | Nichols et al. | 704/275 |
| 2003/0125958 A1* | 7/2003 | Alpdemir et al. | 704/275 |
| 2004/0006478 A1* | 1/2004 | Alpdemir et al. | 704/275 |
| 2004/0176958 A1* | 9/2004 | Salmenkaita et al. | 704/275 |

(Continued)

*Primary Examiner* — Douglas Godbold

(57) ABSTRACT

Disclosed is a method of receiving an audio stream containing user speech from a first device, generating text based on the user speech, identifying a key phrase in the text, receiving from an advertiser an advertisement related to the identified key phrase, and displaying the advertisement. The method can include receiving from an advertiser a set of rules associated with the advertisement and displaying the advertisement in accordance with the associated set of rules. The method can display the advertisement on one or both of a first device and a second device. A central server can generate text based on the speech. A key phrase in the text can be identified based on a confidence score threshold. The advertisement can be displayed after the audio stream terminates.

20 Claims, 3 Drawing Sheets

(56) References Cited

U.S. PATENT DOCUMENTS

| | | | |
|---|---|---|---|
| 2004/0199391 A1* | 10/2004 | Yoon et al. | 704/275 |
| 2005/0261907 A1* | 11/2005 | Smolenski et al. | 704/270 |
| 2006/0224438 A1* | 10/2006 | Obuchi et al. | 705/10 |
| 2006/0280312 A1* | 12/2006 | Mao | 381/56 |
| 2007/0201636 A1* | 8/2007 | Gilbert et al. | 379/88.14 |
| 2007/0234213 A1* | 10/2007 | Krikorian et al. | 715/716 |
| 2008/0115163 A1* | 5/2008 | Gilboa et al. | 725/34 |
| 2008/0214156 A1* | 9/2008 | Ramer et al. | 455/414.1 |
| 2009/0018832 A1* | 1/2009 | Mukaigaito et al. | 704/251 |
| 2009/0076894 A1* | 3/2009 | Bates et al. | 705/14 |
| 2009/0099836 A1* | 4/2009 | Jacobsen et al. | 704/3 |
| 2009/0119154 A1* | 5/2009 | Jung et al. | 705/10 |
| 2009/0187410 A1* | 7/2009 | Wilpon et al. | 704/270.1 |
| 2009/0240576 A1* | 9/2009 | Rothrock et al. | 705/14 |
| 2010/0082432 A1* | 4/2010 | Feng et al. | 705/14.53 |

\* cited by examiner

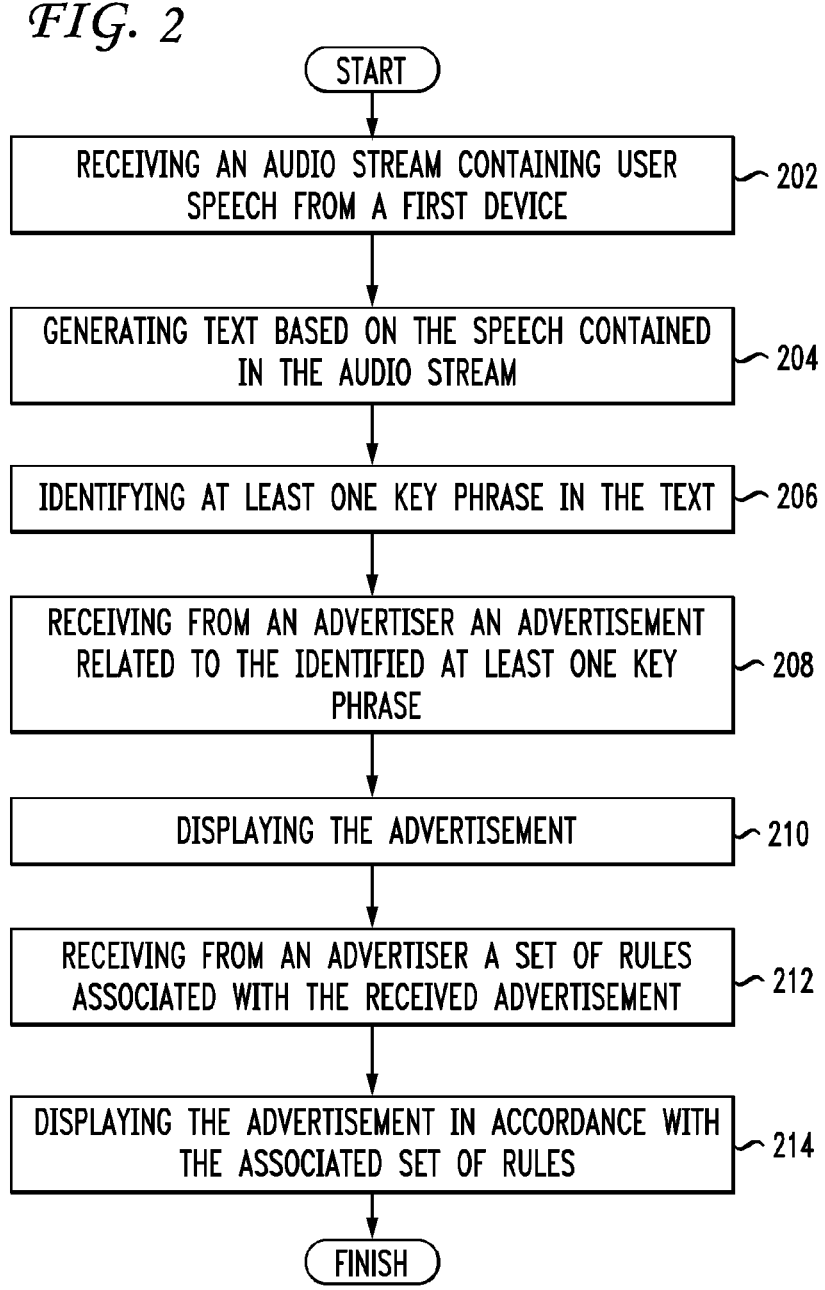

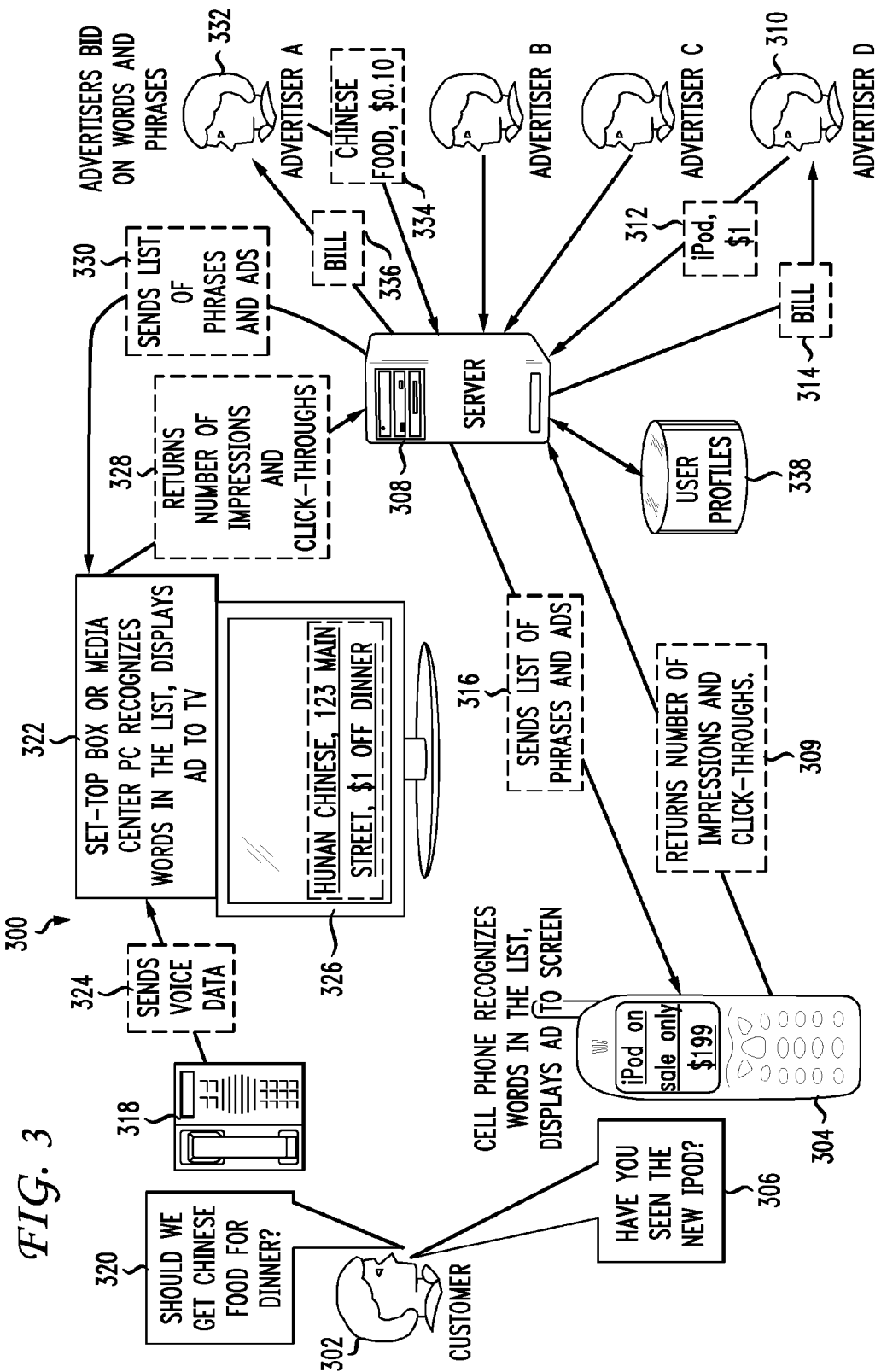

SYSTEM AND METHOD FOR TARGETED ADVERTISING

PRIORITY INFORMATION

The present application is a continuation of U.S. application Ser. No. 12/257,954, filed Oct. 24, 2008, the content of which is incorporated herein by reference in its entirety.

BACKGROUND OF THE INVENTION

1. Field of the Invention

The present invention relates to advertising and more specifically to using speech recognition to target advertisements.

2. Introduction

Businesses advertise goods and services to consumers using print ads in newspapers and magazines, direct mail, telemarketing, television commercials, radio commercials, sponsorships, promotional offers, paid search results and banner ads on the Internet, etc. Consumers are increasingly ignoring or blocking such ads, limiting their effectiveness for advertisers and decreasing their value to sellers of advertising space. For example, computer savvy World Wide Web users can use software, such as Adblock Plus or IE7pro, to filter advertising material in web pages. Another example is a telephone customer who uses Caller ID to screen calls and let any unknown callers go to voicemail. Perhaps the most widely known example is the ability of a digital video recorder (DVR) to skip commercials. But even before the advent of the DVR, the remote control allowed users to channel surf when commercials started.

As a consequence, advertisers seek more effective, direct, targeted ways to advertise to consumers. Consumers respond better to more relevant advertising material that is of direct interest. Advertisers may also enjoy more cost-effective advertising when they target only those consumers who are interested in the advertised product or service. While advertisers may pay more for each advertising impression, each impression is of higher value if it is more likely to result in a sale or in a desired behavior. Accordingly, what is needed in the art is a better way to target advertisements.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for targeted advertising, the method including receiving an audio stream containing user speech from a first device, generating text based on the speech contained in the audio stream, identifying at least one key phrase in the text, receiving from an advertiser an advertisement related to the identified at least one key phrase, and displaying the advertisement. In one aspect, the method further includes receiving from an advertiser a set of rules associated with the received advertisement and displaying the advertisement in accordance with the associated set of rules. The first device can be a converged voice and data communications device connected to a network. The communications device can generate text based on the speech.

In one aspect, the method displays the advertisement on one or both of a converged voice and data communications device and a second communications device. A central server can generate text based on the speech. At least one key phrase in the text can be identified based on a confidence score threshold. In another aspect, the method further includes receiving multiple audio streams containing speech from a same user and generating text based on the speech contained in the multiple audio streams. The advertisement can be displayed after the audio stream terminates.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates an example method embodiment; and

FIG. 3 illustrates a sample system for targeted advertising.

DETAILED DESCRIPTION

Figure 1:
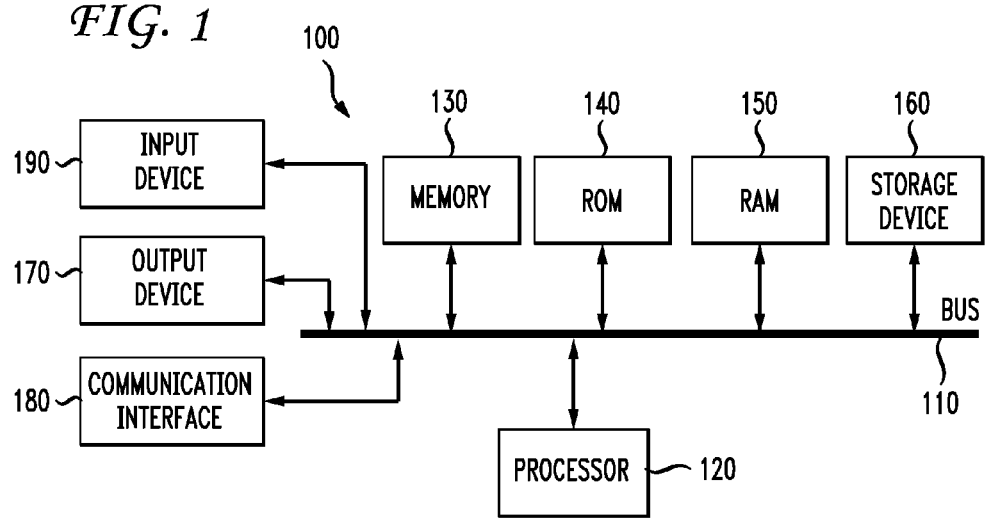
FIG. 1 illustrates an example system embodiment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Having discussed some fundamental system components, the disclosure turns to the exemplary method embodiment. For clarity, the method is discussed in terms of a system configured to practice the method. FIG. 2 illustrates an example method embodiment for targeted advertising. The system receives an audio stream containing user speech from a first device (202). The audio stream can be a telephone call, a Voice over IP (VoIP) call, a voice mail, dictation to a smart phone, a conference call, and/or other spoken communication. The audio stream can even be an interaction between a human and an interactive voice response system (IVR). With appropriate privacy agreements and disclosures, a smart phone or other portable communications device can passively monitor user speech that a user does not primarily intend for the communications device. The source and method of receiving the audio stream are not limiting of the principles of the invention. The device can be a converged voice and data communications device connected to a network such as a smart phone. Some specific examples of converged voice and data communications device include RIM Blackberry®, Apple iPhone®, and Palm Treo®.

The system generates text based on the speech contained in the audio stream (204). The first device or a central server can perform this step. In one aspect, this speech recognition step is distributed across the communications device and one or more server. The system can use known or yet to be developed automatic speech recognition (ASR) technology. The generated text can include peripheral non-textual information, such as a speech recognition confidence score.

The system identifies at least one key phrase in the text (206). The system can analyze the text based on the speech in the audio stream and identify words or phrases of high contextual importance, words that occur frequently, and/or words that have high importance to advertisers. For instance, if the same word occurs more than once per sentence, the system can identify that word as a key phrase. Some example key phrases are "new car", "football", "chocolate", and "let's go see a movie." As natural language understanding technology improves, the system can infer the key phrase based on the content of the conversation. For example, if the speech contains words such as "play date", "diaper", "sippy cup", and "Cookie Monster", the system can infer and identify a key phrase of "infant", "toddler", or "mother". If the speech contains words such as "bull", "bear", "P/E ratio", or "short sell", the system can infer and identify a key phrase of "stock broker" or "day trader". Each identified key phrase can trigger different types of advertisements.

This step is similar to how Google™ services textual Internet searches. Google examines search terms and selects advertisements to display based on the search terms. One large difference between Google and the present disclosure is that a search query entered in Google is unambiguous plain text. In recognized speech, key phrases may not be so clear due to recognition errors, distorted audio streams, background noise, etc. While modern speech recognition technology is very advanced, it is not now and is not likely to ever be perfect. Thus, in one embodiment the system identifies key phrases in the text based on a confidence score threshold. For example, if the system identifies a key phrase but it has a very low confidence score, the system can discard that key phrase.

In one aspect, the system can identify key phrases based on extra-textual information such as detected emotions, speech rate, and prosody information. For example, the system can determine that words spoken in an excited manner are more likely to be key phrases or words that are spoken slowly are less likely to be key phrases.

The system receives from an advertiser an advertisement related to the identified at least one key phrase (208). Advertisements can include text, pictures, audio, video, coupons, and other advertising or promotional material. For example, based on the key phrase "new car", an advertiser such as Ford can send the system an audio advertisement for a Ford Explorer. Based on the key phrase "football", an advertiser such as the National Football League (NFL) can send the system a video advertisement for an upcoming Monday Night Football game. Based on the key phrase "chocolate", an advertiser such as Toblerone can send the system a text-based advertisement including a coupon code for 30% off. Based on the key phrase "let's go see a movie", an advertiser such as a local movie theater can send the system a blended advertisement including text of the movie titles and show times, audio movie reviews, pictures of movie posters, coupons for discounted popcorn, and even trailers for currently showing movies.

In one aspect, the system stores a user profile containing information describing the user, usage habits, previously recognized key phrases, demographic information, and other relevant personal and usage information. Advertisements can relate not only to identified key phrases, but also to the user profile.

The system then displays the advertisement (210). Displaying includes playing audio, showing a movie, displaying text, displaying a picture, etc. The system can display advertisements on a converged voice and data communications device and/or on a second communications device. The system can display advertisements simultaneous with the audio stream or after the audio stream terminates. For example, if a user is making a call on a smart phone, the system can display advertisements on the smart phone's screen during the phone call, immediately after the phone call, or at some later time. The system can display advertisements on a user's laptop screen during a VoIP conversation. The system can display advertisements on a user's IPTV set-top box while the user is talking on a cell phone. The system can display advertisements on one or more of these devices at some specified interval after the end of the call or after identifying the key phrase, such as 5 minutes, 1 hour, 2 weeks, etc. A central server can coordinate and orchestrate displaying advertisements on more than one device.

The system optionally receives from an advertiser a set of rules associated with the received advertisement (212) and displays the advertisement in accordance with the associated set of rules (214). Advertisers can establish different sets of rules depending on the type of key phrase and urgency of the key phrase subject matter. For example, "I'm hungry" is potentially a more urgent key phrase than "new car". A restaurant can attach a timing rule that the system display its ads, if at all, within 60 seconds of the key phrase with the hope that the fast turnaround time influences the speaker's pending decision of a place to eat. A restaurant can attach a location rule that the system display its ads, if at all, only to people located within 15 miles of the restaurant. A breakfast shop can attach a timing rule that the system display its ads, if at all, only during the hours of 5:30 a.m. and 9:30 a.m. An advertiser who provides a video ad can attach a rule that the ad is played only on at least 5" screens and if a 5" screen is unavailable, then to display an audio ad accompanied by a still picture.

Other examples of rules include a very high confidence score threshold and a minimum income level. Advertisers can attach rules regarding minimum and/or maximum ad playback frequency. For instance, the advertiser can specify that the system displays the ad to targeted users at least once a day or that the system displays the ad to targeted users no more than once a week.

In one aspect, the system receives multiple audio streams containing speech from the same user. In this case, the system also generates text based on the speech contained in the multiple audio streams. One example application of this is a server that tracks key phrases uttered over time during telephone conversations of a smart phone customer. For example, if the smart phone customer consistently mentions "soccer" several times per month, but not in every telephone conversation, the system can aggregate user-uttered speech from multiple telephone calls. The aggregated information can influence advertisement playback. In one aspect, the system assigns weights to aggregated information based on frequency of key phrase occurrence, key phrase recency, user responsiveness to advertisements based on a key phrase, and so forth.

A system configured to store aggregated information can waste significant storage space due to unnecessary duplication. For example, a lengthy, seven-participant conference call can potentially lead to seven separate files on the server which each store essentially the same information. In order to prevent duplication and wasted storage space, the system can maintain a central database of shared key phrases and other common information about a telephone call. For example, the system can store a pointer to a set of information and key phrases in the user profile for each of the seven participants. In this way, user profile information is more efficiently stored and more uniformly represented.

FIG. 3 illustrates a sample system for targeted advertising. The system 300 allows a customer 302 to speak on a communications device 304 such a cellular phone. In this example, the user says the phrase "Have you seen the new iPod?" 306 during the course of a normal telephone conversation with another person. The cell phone or a remote server can recognize key phrases in the conversation. The cell phone 304 returns to a server 308 a number of impressions and click-throughs 309. The number of impressions refers to how many times a particular advertisement has been displayed. A click-through refers to a positive user response to a displayed advertisement. The name click-through is analogous to Internet advertising where users click on web advertisements to learn more. Some examples of click-throughs to such targeted advertising are button presses, navigating to a web site, changes in the conversation, later purchases on a credit card registered to a user profile, and voice commands.

Multiple advertisers communicate with the server 308 to bid on key phrases, upload advertising content, and check advertising statistics and reports. For example, the customer 302 speaking on the cell phone 304 says "Have you seen the new iPod?" 306. Advertiser D 310 bids $1 to place their advertisement on devices participating in conversations where the word iPod appears 312. As the advertisements are served to devices, the server can bill 314 the advertiser for services rendered. Advertiser D 310 uploads their advertisement to the server 308. The server 308 can transmit advertisements to the cell phone 304 dynamically as indicated by recognized key phrases, or the server 308 can send a list of key phrases and advertisements 316 to the cell phone 304 in anticipation of future use. Advertiser D 310 can also upload a set of rules governing use and display of the uploaded advertisement, as described above. In this case, the spoken words "Have you seen the new iPod?" 306 trigger an advertisement on the cell phone 304 listing the iPod on sale for only $199 as a clickable link.

The same customer 302 can use a different phone 318 after completing the conversation on the cell phone 304. The customer 302 says "Should we get Chinese food for dinner?" 320. The phone can be a plain old telephone service (POTS), a VoIP phone, or other communications device. In this example, the phone 318 communicates with a set-top box 322 connected to the server 308. The phone sends raw, unprocessed voice data 324 to the set-top box 322. This is in contrast to the cell phone 304 which may have a more sophisticated CPU or voice processing unit capable of performing all or part of the speech recognition on the cell phone 304 itself The set-top box 322 is connected to a television 326 or other display device, such as a DVR or a personal computer. The set-top box 322 can include a CPU able to process speech and a storage device able to store key phrases and advertisements. The set-top box 322 can identify key phrases in voice data received from the phone 318 and display advertisements on the television 326. As the system 300 displays advertisements and users respond to those advertisements, the set-top box 322 returns the number of impressions and click-throughs 328 to the server 308. The server 308 sends a list of key phrents 330 to the set-top box 322. For example, the customer 302 says "Should we get Chinese food for dinner?" 320. Advertiser A 332 bids $0.10 to place their advertisement simultaneously with conversations including the words "Chinese food" 334. As the advertisements are displayed, the server 308 can bill 336 Advertiser A 332. Advertiser A 332 can upload her advertisement to the server 308. The server can transmit advertisements to the set-top box 322 for display on the television. The server can also send an email to the user, text message the user, call the user with a pre-recorded message, or use almost any other advertising modality. In this case, the spoken words "Should we get Chinese food for dinner?" 320 trigger an advertisement on the bottom of the television screen 326 showing the address of a local Chinese restaurant and offering a discount. While a set-top box 322 is shown and discussed, it can easily be replaced with a home media server, a personal computer, or other suitable device.

In both the phone 318 and cell phone 304 examples, the server 308 can create, store, and update user profiles 338. User profiles store personal and demographic information about users, usage history, user responsiveness to different types of advertisements, lists of previous purchases, and other information. For example, when a user constantly talks about yard work across many conversations on her home phone, cell phone, and voice mails, the system stores that information in the user profile and assigns yard work related advertisements a higher weight or increased priority. A user can manually enter or change all or part of a user profile, such as through a web-based user interface.

While each of the discussed examples displays a single advertisement in response to a key phrase, a key phrase can trigger multiple advertisements at the same time. Advertisers can pay an extra fee for prominent placement among multiple advertisements triggered at the same time. Advertisers can even pay an extra fee for exclusive listing. These extra fees can be extremely targeted and fine-grained. For example, a breakfast cereal manufacturer can pay the extra fee for prominent or exclusive placement of advertisements to mothers of 3 or more children which have a household income over $65,000 per year. A newspaper publisher can pay the extra fee for prominent or exclusive placement of advertisements based on key phrases related to current events to homeowners in the delivery area of the newspaper. Other variations are possible.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to telephone calls, VoIP calls, web chats, voicemail, and even email attachments containing speech data. Those skilled in the art will readily recognize various modifications and changes that may be made to the present invention without following the example embodiments and applications illustrated and described herein, and without departing from the true spirit and scope of the present invention.

I claim:

1. A method comprising:
   receiving speech of a user;
   generating, via a processor, text based on the speech;
   identifying a key phrase in the text based on an emotion of the user;
   receiving, via the processor, data from a user profile comprising one of information describing the user, usage habits of the user, previously recognized key phrases of the user, and demographic information of the user; and
   receiving an advertisement related to the key phrase and the data.

2. The method of claim 1, further comprising displaying the advertisement.

3. The method of claim 2, wherein displaying the advertisement occurs a period of time after receiving the speech.

4. The method of claim 3, wherein receiving the speech occurs during a call.

5. The method of claim 4, wherein displaying the advertisement occurs a period of time after one of an ending of the call and after identifying the key phrase.

6. The method of claim 2, wherein displaying the advertisement occurs while receiving the speech.

7. The method of claim 1, wherein the speech is received from a first device and wherein displaying the advertisement occurs on a second device different from the first device.

8. The method of claim 1, further comprising:
   receiving from an advertiser a set of rules associated with the advertisement; and
   displaying the advertisement in accordance with the set of rules.

9. The method of claim 1, wherein at least one key phrase in the text is identified based on a confidence score threshold.

10. The method of claim 1, the method further comprising:
    receiving multiple audio streams containing other speech from a same user; and
    generating text based on the other speech contained in the multiple audio streams.

11. A system comprising:
    a processor; and
    a computer-readable medium storing instructions which, when executed by the processor, cause the processor to perform operations comprising:
      receiving speech of a user;
      generating text based on the speech;
      identifying a key phrase in the text based on an emotion of the user;
      receiving data from a user profile comprising one of information describing the user, usage habits of the user, previously recognized key phrases of the user, and demographic information of the user; and
      receiving an advertisement related to the key phrase and the data.

12. The system of claim 11, wherein the computer-readable medium having additional instructions stored which, when executed by the processor, result in operations comprising displaying the advertisement.

13. The system of claim 12, wherein displaying the advertisement occurs a period of time after receiving the speech.

14. The system of claim 13, wherein receiving the speech occurs during a call.

15. The system of claim 14, wherein displaying the advertisement occurs a period of time after one of an ending of the call and after identifying the key phrase.

16. The system of claim 12, wherein displaying the advertisement occurs while receiving the speech.

17. The system of claim 11, wherein the speech is received from a first device and wherein displaying the advertisement occurs on a second device different from the first device.

18. The system of claim 11, the computer-readable medium having additional instructions stored which, when executed by the processor, result in operations comprising:
    receiving from an advertiser a set of rules associated with the advertisement; and
    displaying the advertisement in accordance with the set of rules.

19. The system of claim 11, wherein the computer-readable medium having additional instructions stored which, when executed by the processor result in operations comprising:
    receiving multiple audio streams containing other speech from a same user; and
    generating text based on the other speech contained in the multiple audio streams.

20. A computer-readable storage device having instructions stored which, when executed by a processor, cause the processor to perform operations comprising:
    receiving speech of a user;
    generating text based on the speech;
    identifying a key phrase in the text based on an emotion of the user;
    receiving data from a user profile comprising one of information describing the user, usage habits of the user, previously recognized key phrases of the user, and demographic information of the user; and
    receiving an advertisement related to the key phrase and the data.

* * * * *